United States Patent
Xiao

(10) Patent No.: US 10,062,898 B2
(45) Date of Patent: Aug. 28, 2018

(54) SURFACE COATING METHOD AND METHOD FOR IMPROVING ELECTROCHEMICAL PERFORMANCE OF AN ELECTRODE FOR A LITHIUM BASED BATTERY

(71) Applicant: GM GLOBAL TECHNOLOGY OPERATIONS LLC, Detroit, MI (US)

(72) Inventor: Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 560 days.

(21) Appl. No.: 14/321,418

(22) Filed: Jul. 1, 2014

(65) Prior Publication Data

US 2015/0014890 A1   Jan. 15, 2015

Related U.S. Application Data

(60) Provisional application No. 61/844,455, filed on Jul. 10, 2013.

(51) Int. Cl.
*H01M 4/04* (2006.01)
*H01M 4/1393* (2010.01)
(Continued)

(52) U.S. Cl.
CPC ....... *H01M 4/0471* (2013.01); *H01M 4/0416* (2013.01); *H01M 4/133* (2013.01);
(Continued)

(58) Field of Classification Search
None
See application file for complete search history.

(56) References Cited

U.S. PATENT DOCUMENTS 7,018,607 B2   3/2006   Nazri et al.
7,208,248 B2   4/2007   Hayashi et al.
(Continued)

FOREIGN PATENT DOCUMENTS

CN   1328355 A   12/2001
CN   1774826 A   5/2006
(Continued)

OTHER PUBLICATIONS

First Office Action for Chinese Patent Application No. 201410381733.4 dated Mar. 3, 2016; 8 pages.
(Continued)

*Primary Examiner* — Shamim Ahmed
*Assistant Examiner* — Bradford M Gates
(74) *Attorney, Agent, or Firm* — Harness, Dickey & Pierce, P.L.C.

(57) ABSTRACT

In an example of the surface coating method, an aromatic resin or a polycyclic aromatic hydrocarbon is dissolved in an organic solvent to form a solution. A film precursor is formed on a surface of an electrode material by immersing the electrode material into the solution, and evaporating the organic solvent. The electrode material is selected from the group consisting of an electrode active material particle and a pre-formed electrode. The film precursor is exposed to i) a thermal treatment having a temperature equal to or less than 500° C., or ii) ultraviolet light irradiation, or iii) both i and ii, to carbonize the film precursor to form a carbon film on the surface of the electrode material. Also disclosed herein is a method for improving electrochemical performance of an electrode for a lithium based battery.

15 Claims, 5 Drawing Sheets

(51) Int. Cl.
  *H01M 10/052* (2010.01)
  *H01M 4/133* (2010.01)
  *H01M 4/36* (2006.01)
  *H01M 4/134* (2010.01)
  *H01M 4/136* (2010.01)
  *H01M 4/1395* (2010.01)
  *H01M 4/1397* (2010.01)

(52) U.S. Cl.
  CPC ......... *H01M 4/1393* (2013.01); *H01M 4/366* (2013.01); *H01M 10/052* (2013.01); *H01M 4/134* (2013.01); *H01M 4/136* (2013.01); *H01M 4/1395* (2013.01); *H01M 4/1397* (2013.01)

(56) References Cited

U.S. PATENT DOCUMENTS

| | | | |
|---|---|---|---|
| 7,736,805 | B2 | 6/2010 | Nazri et al. |
| 8,101,152 | B1 | 1/2012 | Halalay et al. |
| 8,148,455 | B2 | 4/2012 | Posudievsky et al. |
| 8,383,273 | B2 | 2/2013 | Machida et al. |
| 8,399,138 | B2 | 3/2013 | Timmons |
| 8,420,259 | B2 | 4/2013 | Xiao et al. |
| 8,440,350 | B1 | 5/2013 | Verbrugge et al. |
| 8,568,930 | B2 | 10/2013 | Halalay et al. |
| 8,642,201 | B2 | 2/2014 | Cheng et al. |
| 8,647,779 | B2 | 2/2014 | Machida et al. |
| 8,658,295 | B2 | 2/2014 | Cheng et al. |
| 8,663,840 | B2 | 3/2014 | Nazri et al. |
| 8,679,680 | B2 | 3/2014 | Vanimisetti et al. |
| 8,785,054 | B2 | 7/2014 | Halalay et al. |
| 8,828,481 | B2 | 9/2014 | Burton et al. |
| 8,835,056 | B2 | 9/2014 | Xiao et al. |
| 8,974,946 | B2 | 3/2015 | Cai et al. |
| 8,999,584 | B2 | 4/2015 | Jiang et al. |
| 9,012,075 | B2 | 4/2015 | Verbrugge et al. |
| 9,023,520 | B2 | 5/2015 | Halalay et al. |
| 9,028,565 | B2 | 5/2015 | Huang |
| 9,077,038 | B2 | 7/2015 | Halalay et al. |
| 9,093,705 | B2 | 7/2015 | Xiao et al. |
| 9,123,939 | B2 | 9/2015 | Xiao et al. |
| 9,142,830 | B2 | 9/2015 | Xiao et al. |
| 9,153,819 | B2 | 10/2015 | Huang et al. |
| 9,160,036 | B2 | 10/2015 | Yang et al. |
| 9,252,411 | B2 | 2/2016 | Abd Elhamid et al. |
| 9,281,515 | B2 | 3/2016 | Nazri |
| 9,302,914 | B2 | 4/2016 | Liu et al. |
| 9,337,512 | B2 | 5/2016 | An et al. |
| 9,350,046 | B2 | 5/2016 | Huang |
| 9,356,281 | B2 | 5/2016 | Verbrugge et al. |
| 9,362,551 | B2 | 6/2016 | Sachdev et al. |
| 9,362,552 | B2 | 6/2016 | Sohn et al. |
| 9,362,560 | B2 | 6/2016 | Nazri |
| 9,373,829 | B2 | 6/2016 | Xiao et al. |
| 9,412,986 | B2 | 8/2016 | Huang |
| 9,437,871 | B2 | 9/2016 | Zhou et al. |
| 9,520,594 | B2 | 12/2016 | Neumann et al. |
| 9,537,144 | B2 | 1/2017 | Huang et al. |
| 9,583,767 | B2 | 2/2017 | Verbrugge et al. |
| 9,647,254 | B2 | 5/2017 | Dadheech et al. |
| 9,742,028 | B2 | 8/2017 | Zhou et al. |
| 9,786,906 | B2 | 10/2017 | Yang et al. |
| 2002/0012850 | A1 | 1/2002 | Schmidt et al. |
| 2003/0003361 | A1* | 1/2003 | Sunagawa ............ C01G 45/00 429/224 |
| 2005/0276910 | A1* | 12/2005 | Gupta ................ H01L 27/3246 427/66 |
| 2006/0147799 | A1* | 7/2006 | Hayashi ................ H01M 4/133 429/231.8 |
| 2007/0195448 | A1* | 8/2007 | Xie .......................... G06F 7/588 360/75 |
| 2008/0186030 | A1* | 8/2008 | Kasamatsu ........... H01M 10/44 324/426 |
| 2008/0245553 | A1* | 10/2008 | Sakai ..................... B82Y 10/00 174/257 |
| 2011/0027650 | A1* | 2/2011 | Yamamoto ........... H01M 4/134 429/218.1 |
| 2012/0100403 | A1 | 4/2012 | Wang et al. |
| 2012/0175551 | A1* | 7/2012 | Watanabe ............... C22C 18/00 252/182.1 |
| 2012/0229096 | A1 | 9/2012 | Nazri |
| 2012/0231321 | A1 | 9/2012 | Huang et al. |
| 2012/0328927 | A1 | 12/2012 | Timmons et al. |
| 2013/0078517 | A1* | 3/2013 | Shon .................... H01M 4/0471 429/221 |
| 2013/0099159 | A1 | 4/2013 | Halalay et al. |
| 2013/0136997 | A1 | 5/2013 | An et al. |
| 2013/0244080 | A1 | 9/2013 | Song et al. |
| 2013/0284338 | A1 | 10/2013 | Xiao et al. |
| 2014/0272526 | A1 | 9/2014 | Huang |
| 2014/0272558 | A1 | 9/2014 | Xiao et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0104690 | A1 | 4/2015 | Xiao et al. |
| 2015/0162602 | A1 | 6/2015 | Dadheech et al. |
| 2015/0236324 | A1 | 8/2015 | Xiao et al. |
| 2015/0349307 | A1 | 12/2015 | Dadheech et al. |
| 2016/0020491 | A1 | 1/2016 | Dai et al. |
| 2016/0111721 | A1 | 4/2016 | Xiao et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0218342 | A1 | 7/2016 | Xiao et al. |
| 2016/0254567 | A1 | 9/2016 | Cai et al. |
| 2017/0141382 | A1 | 5/2017 | Dadheech et al. |
| 2017/0141383 | A1 | 5/2017 | Dadheech et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0327948 | A1 | 11/2017 | Dadheech et al. |
| 2017/0338490 | A1 | 11/2017 | Xiao et al. |

FOREIGN PATENT DOCUMENTS

| | | |
|---|---|---|
| CN | 101471455 A | 7/2009 |
| CN | 101872872 A | 10/2010 |
| CN | 103038930 A | 4/2013 |
| CN | 103050667 A | 4/2013 |
| CN | 104282885 A | 1/2015 |
| CN | 105703005 A | 6/2016 |
| CN | 105703006 A | 6/2016 |
| DE | 102014109441 A1 | 1/2015 |
| DE | 102015121310 A1 | 6/2016 |
| DE | 102015121342 A1 | 6/2016 |
| EP | 2573841 A1 | 3/2013 |
| KR | 1020120080831 A | 7/2012 |
| TW | 201305085 A | 2/2013 |
| WO | WO2008/128726 | 10/2008 |
| WO | WO-2014182281 A1 | 11/2014 |
| WO | WO-2015126649 A1 | 8/2015 |

OTHER PUBLICATIONS

Second Office Action for Chinese Application No. 201410381733.4 dated Nov. 14, 2016; 11 pages.
Third Office Action for Chinese Application No. 201410381733.4 dated Jul. 4, 2017; 13 pages.
First Office Action for Chinese Application No. 201510910065.4 dated Oct. 26, 2017; 10 pages.
First Office Action for Chinese Application No. 201510910062.0 dated Sep. 29, 2017; 7 pages.
Li Yang et al.; U.S. Appl. No. 15/237,378, filed Aug. 15, 2016 entitled "Gel Electrolytes and Precursors Thereof"; 23 pages.
Fang Liu et al.; U.S. Appl. No. 15/666,170, filed Aug. 1, 2017 entitled "Conformal Coating Of Lithium Anode Via Vapor Depo-

(56) References Cited

OTHER PUBLICATIONS sition For Rechargeable Lithium Ion Batteries"; 52 pages.

J. G. Zhang et al.; "Lithium Metal Anodes And Rechargeable Lithium Metal Batteries"; Chapter 2, Characterization and Modeling of Lithium Dendrite Growth; Springer Series in Materials Science 249, DOI 10.1007/978-3-319-44054-5_2; Springer International Publishing Switzerland 2017; 40 pages.

Chung, Kwang-il et al.; "Lithium Phosphorous Oxynitride As A Passive Layer For Anodes In Lithium Secondary Batteries"; Journal of Electroanalytical Chemistry 566 (2004); pp. 263-267.

Kozen, Alexander C. et al.; "Next-Generation Lithium Metal Anode Engineering Via Atomic Layer Deposition"; ACS Nano; vol. 9; No. 6; May 13, 2015; pp. 5884-5892.

\* cited by examiner

SURFACE COATING METHOD AND METHOD FOR IMPROVING ELECTROCHEMICAL PERFORMANCE OF AN ELECTRODE FOR A LITHIUM BASED BATTERY

CROSS-REFERENCE TO RELATED APPLICATIONS

This application claims the benefit of U.S. Provisional Patent Application Ser. No. 61/844,455 filed Jul. 10, 2013, which is incorporated by reference herein in its entirety.

BACKGROUND

Secondary, or rechargeable, lithium ion batteries and lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use.

SUMMARY

A surface coating method and a method for improving electrochemical performance of an electrode for a lithium based battery are disclosed. In an example of the surface coating method, an aromatic resin or a polycyclic aromatic hydrocarbon is dissolved in an organic solvent to form a solution. A film precursor is formed on a surface of an electrode material by immersing the electrode material into the solution, and evaporating the organic solvent. The electrode material is selected from the group consisting of an electrode active material particle and a pre-formed electrode. The film precursor is exposed to i) a thermal treatment having a temperature equal to or less than 500° C., or ii) ultraviolet light irradiation, or iii) both i and ii, to carbonize the film precursor to form the carbon film on the surface of the electrode material.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
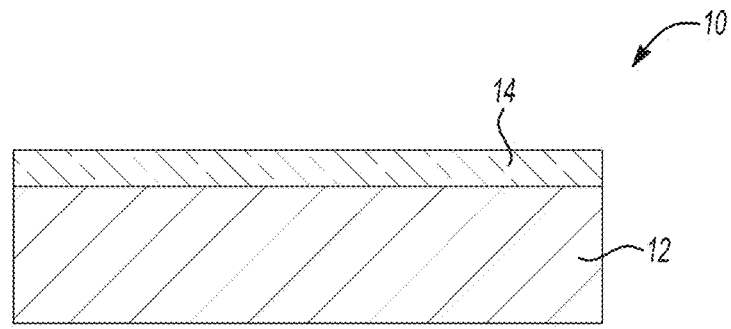
FIG. 1 is a cross-sectional view of an example of a carbon film coated electrode material formed by an example of the surface coating method disclosed herein.

The ability of lithium ion and lithium-sulfur batteries to undergo repeated power cycling over their useful lifetimes makes them an attractive and dependable power source. It is desirable for these batteries to have a high discharge capacity and an extended life. Some examples of the method(s) disclosed herein create a surface coating on an electrode material (e.g., either a positive or a negative electrode material) that improves the electrochemical performance (e.g., coulombic efficiency, cycleability, etc.) of the electrode material. It is believed that the surface coating mitigates both mechanical and chemical degradation of the electrode material, and thus improves the cycle stability of the electrode material. Still further, it is believed that the surface coating enhances the electrical conductivity of the electrode material, which contributes to improved rate capability.

It is also believed that the surface coating may suppress undesirable side reactions within a lithium ion battery or a lithium sulfur battery by preventing direct contact of the electrode material and the electrolyte solution and changing the surface chemistry of electrode materials. The life cycle of both lithium-sulfur and lithium ion batteries may be limited by the migration, diffusion, or shuttling of certain species from the positive electrode during the battery discharge process, through the porous polymer separator, to the negative electrode. For example, in lithium-sulfur batteries, this species includes $S_x$ polysulfides generated at a sulfur-based positive electrode, and in lithium ion batteries, this species includes transition metal cations from the positive electrode.

The $S_x$ polysulfides generated at the sulfur-based positive electrode of a lithium-sulfur battery are soluble in the electrolyte, and can migrate to the negative electrode where they react with the negative electrode in a parasitic fashion to generate lower-order polysulfides. These lower-order polysulfides diffuse back to the positive electrode and regenerate the higher forms of polysulfide. As a result, a shuttle effect takes place. This effect leads to decreased sulfur utilization, self-discharge, poor cycleability, and reduced Coulombic efficiency of the battery. It is believed that even a small amount of polysulfide at the negative electrode can lead to parasitic loss of active lithium at the negative electrode, which prevents reversible electrode operation and reduces the useful life of the lithium-sulfur battery.

Similarly, the transition metal cations dissolve in the electrolyte and migrate from the positive electrode of the lithium ion battery to the negative electrode of the battery, leading to its "poisoning". In one example, a graphite electrode is poisoned by $Mn^{+2}$ or $Mn^{+3}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn atoms can poison the graphite electrode and prevent reversible electrode operation, thereby reducing the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge-discharge cycling).

In the examples disclosed herein, the positive electrode may be coated with the surface coating, which protects the electrode from direct attack by the polysulfides (when used in a lithium-sulfur battery) or by the transition metal cations (when used in a lithium ion battery), and reduces side reactions. As such, the surface coating can mitigate the shuttle effect or poisoning effect, and in turn improve the efficiency and life cycle of the battery.

Some examples of the method(s) disclosed herein involve low temperatures (e.g., 500° C. or less) and do not require a reducing environment to prevent oxidization of carbon films. These characteristics of the method(s) may be advantageous for manufacturing purposes when compared, for example, to other methods that involve high temperature heating and/or require reducing environments, which may, in some instances, cause damage to the oxide based electrode materials.

It is believed that higher temperatures may be used in some examples of the method disclosed herein, as long as the temperature selected does not deleteriously affect (e.g., degrade, damage, etc.) the underlying substrate (e.g., electrode material).

Each example of the method disclosed herein results in the formation of a carbon film coated electrode material 10, a cross-section of which is shown in FIG. 1. As illustrated in this cross-sectional view, an electrode material 12 is coated with a carbon film 14. The carbon film 14 is covalently or non-covalently bonded to functional groups (such as —OH groups, —NH$_3$ groups, —COOH groups, etc.) present on the surface of the electrode material 12 as a result of the method(s) disclosed herein.

The electrode material 12 may be either a negative electrode material or a positive electrode material, depending upon whether the carbon film coated electrode material 10 is to be used as the negative electrode or the positive electrode.

The negative electrode may include any lithium host material (i.e., active material) that can sufficiently undergo lithium plating and stripping while copper or another suitable current collector functions as the negative terminal of the lithium ion battery. Example negative electrode materials include a silicon powder (e.g., silicon micro- or nano-powders), a silicon nanotube, a silicon nanofiber, a silicon alloy (e.g., $Si_xSn_{(1-x)}$ or $Si_xSn_yM_{(1-x-y)}$, where M is any other metal), $SiO_x$ (0<x<2), graphene, a SiC composite, a tin powder (e.g., tin micro- or nano-powders), a tin alloy ($Cu_xSn_{1-x}$), an aluminum alloy ($Al_xSi_{1-x}$, $Al_xTi_{(1-x)}$), graphite, lithium titanate ($LiTiO_3$), or titanium oxide (e.g., $TiO_2$).

When the electrode material 12 is to be used in a lithium ion battery, the electrode material 12 may be formed from any lithium-based active material that can sufficiently undergo lithium insertion and deinsertion while aluminum or another suitable current collector is functioning as the positive terminal of the lithium ion battery. One common class of known lithium-based active materials suitable for the positive electrode includes layered lithium transitional metal oxides. Example positive electrode materials include a lithium manganese oxide, a lithium nickel manganese oxide, a lithium cobalt oxide, a lithium nickel manganese cobalt oxide, a lithium nickel oxide, a lithium iron phosphate, or vanadium oxide. As a specific example, the positive electrode material may have the formula $xLi_2MnO_3 \cdot (1-x)LiMO_2$, where $0 \le x \le 1$, and where M=any ratio of Ni, Co and/or Mn. Some other specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$ or $Li(Ni_xMn_yCo_z)O_4$], or a lithium iron polyanion oxide, such as lithium iron phosphate ($LiFePO_4$), or lithium iron fluorophosphate ($Li_2FePO_4F$). Other lithium-based active materials may also be utilized, such as $LiNi_xM_{1-x}O_2$ (M is composed of any ratio of Al, Co, and/or Mg), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), and any other high efficiency nickel-manganese-cobalt material.

When the electrode material 12 is to be used in a lithium-sulfur battery, the electrode material 12 may be formed from any sulfur-based active material that can sufficiently undergo lithium insertion and deinsertion while aluminum or another suitable current collector is functioning as the positive terminal of the battery. Examples of sulfur-based electrode materials 12 include $S_8$, $Li_2S_8$, $Li_2S_6$, $Li_2S_4$, $Li_2S_3$, $Li_2S_2$, and $Li_2S$.

The electrode material 12 may either be in the form of electrode active material particles (e.g., nanoparticles, microparticles, etc.), or may be a pre-formed electrode. The electrode active material particles may range in size from about a few nanometers (e.g., 2 nm) to about tens of microns (e.g., 50 μm). The pre-formed electrode may have a desirable size, shape, etc. for the application in which the carbon film coated electrode material 10 will be used, or may be in the form of a sheet that can be processed to obtain the desirable size, shape, etc. The pre-formed electrode may also have a suitable binder and/or conductive additive already included therein.

The carbon film 14 is formed as a result of the method(s) disclosed herein. An example of the carbon film 14 that is formed has a graphitic structure, which exhibits good electrical conductivity.

Each example of the method begins with the formation of a solution. This solution is shown at reference numeral 16 of FIG. 2 (which schematically illustrates an example of the method and will be referenced throughout this discussion). The solution 16 is formed by dissolving an aromatic resin or a polycyclic aromatic hydrocarbon (PAH) in an organic solvent. The dissolution of the aromatic resin or PAH in the organic solvent may be accelerated by heating the organic solvent to a temperature up to 100° C. When forming the solution 16, the components may be mixed using any suitable technique, such as magnetic stirring, ultrasound vibration, etc.

The weight ratio of the aromatic resin or PAH to organic solvent in the solution 16 may be up to 50%. The amounts may be adjusted in order to dissolve the selected amount of aromatic resin or PAH in the selected organic solvent.

An example of a suitable aromatic resin includes carbonaceous mesophase. The carbonaceous mesophase may be a derivative of naphthalene, a derivative of petroleum coke, or a derivative of coal tar. Examples of the PAH include Anthracene, Benzo[a]pyrene, Chrysene, Coronene, Corannulene, Tetracene, Naphthalene, Pentacene, Phenanthrene, Pyrene, Triphenylene, Ovalene, and mixtures thereof.

Any organic solvent that is capable of dissolving the aromatic resin or the PAH may be used. In an example, the organic solvent is an aromatic hydrocarbon solvent. Suitable examples include toluene, xylene, tetrahydrofuran (THF), ethylbenzene, mesitylene, durene (also known as 1,2,4,5-tetramethylbenzene), 2-phenylhexane, biphenyl, aniline, nitrobenzene, acetylsalicylic acid (also known as aspirin), and paracetamol. Combinations of organic solvents may also be used. As mentioned above, the amount of organic solvent used is any amount that is sufficient to dissolve the selected aromatic resin or PAH.

In examples of the method, the solution 16 is allowed to sit (e.g., with or without stirring) to allow the organic solvent to break molecular interaction between atoms of the aromatic resin or the PAH to form a two-dimensional (2D) single molecular layer within the solution 16. The 2D single molecular layer may include linear and/or non-linear molecular chains. In order to allow the release of the molecular interaction between atoms of the aromatic resin or the PAH, the solution 16 may be allowed to sit anywhere from 1 minute to about 24 hours. In an example, the reaction between the organic solvent and the aromatic resin or the PAH may take place within a time period ranging from about 1 minute to about 30 minutes.

The solution 16 is used to form a film precursor 14' on a surface of the electrode material 12. To form the film precursor 14', the electrode material 12 (whether in the form of particles or a pre-formed electrode) is immersed into the solution 16.

When electrode active material particles are used as the electrode material 12, the immersion of the material 12 into the solution 16 may involve mixing the electrode active material particles into the solution 16 to form a mixture. Mixing may be accomplished using any suitable technique, such as magnetic stirring, ultrasound vibration, etc. By mixing the electrode active material particles into the solution 16, the electrode active material particles may become more uniformly distributed throughout the solution 16.

Figure 2:
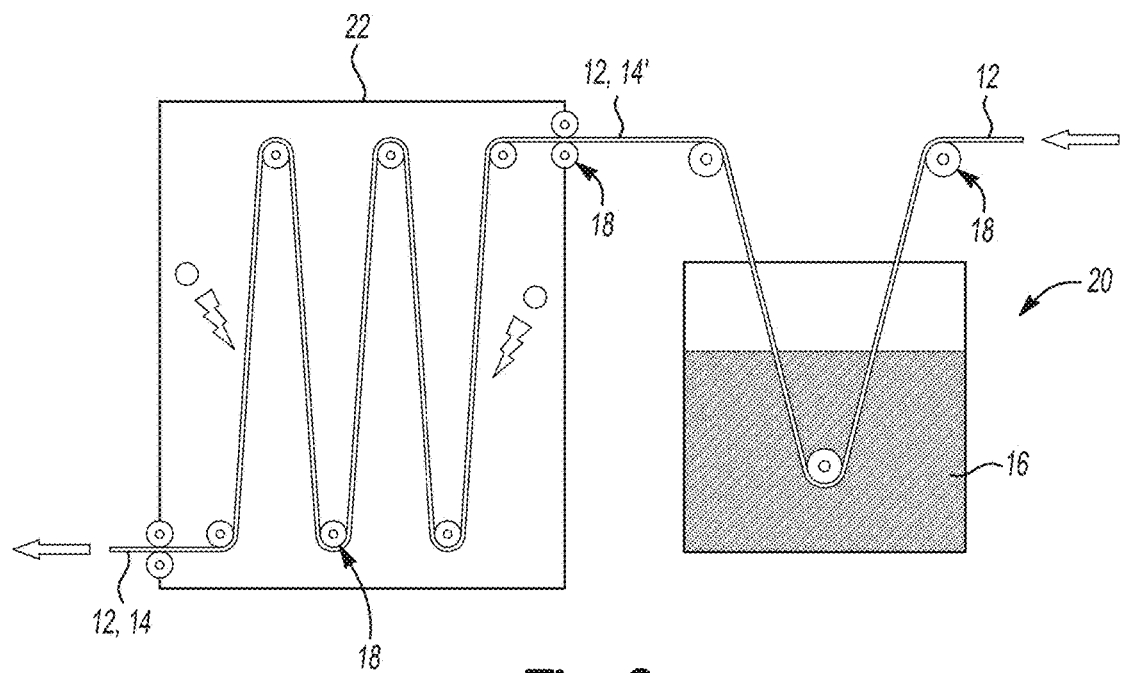
FIG. 2 is a schematic diagram depicting an example of a continuous surface coating method to coat the pre-formed electrode disclosed herein.

When a pre-formed electrode is used as the electrode material 12, the immersion of the material 12 into the solution 16 may involve dipping the pre-formed electrode into the solution 16. An example of this is shown in FIG. 2, where the electrode material 12 is transported through a system 20 by a conveyer belt system 18. The conveyer belt system 18 may guide the pre-formed electrode (i.e., electrode material 12) into the solution 16. Other methods for dipping the pre-formed electrode are also contemplated as being suitable for the method(s) disclosed herein.

Whether electrode active material particles or the preformed electrode is used, the electrode material 12 is allowed to remain in the solution 16 for a time sufficient to allow the 2D single molecular layer within the solution 16 to self-reorganize and to covalently or non-covalently bond with functional groups (e.g., —OH groups, —$NH_3$ groups, —COOH groups, etc., depending upon the electrode material 12 that is used) located at the surface of the electrode material 12. In some instances, the functional groups may inherently be present on the surface of the electrode material 12. If, however, the functional groups are not present naturally on the surface of the electrode material 12, further surface treatments, such as oxygen plasma, hydrogen plasma, $NH_3$ plasma, or wet chemistry, may be applied to the electrode material surface before carbon coating (i.e., before immersing the electrode material 12 into the solution 16). The bonding that takes place will depend upon the functional groups and the aromatic resin or PAH that is used. In an example, non-covalent interaction takes place that involves pi bonds in the 2D single molecular layer and H bonds at the surface of the electrode material 12. In another example, covalent interaction may take place between —H groups and —OH groups or —COOH groups. In yet another example, covalent interaction may take place between —$NH_3$ groups and —OH groups.

The reaction taking place between the 2D single molecular layer in the solution 16 and the functional groups at the surface of the electrode material 12 may be complete within a time frame ranging from about 1 minute to about 24 hours. As such, the electrode material 12 may be allowed to remain in the solution 16 for a time ranging from about 1 minute to about 24 hours. In an example, the reaction takes place in anywhere from about 1 minute to about 30 minutes.

After the electrode material 12 is immersed in the solution 16 for the suitable amount of time, the organic solvent is evaporated and the film precursor 14' is formed. Evaporation may be initiated after the electrode material 12 is removed from the solution 16. Evaporating the organic solvent may be accomplished by heating the electrode material 12 and the film precursor 14' thereon up to 100° C. under atmospheric pressure or in a vacuum oven. The organic solvent may also be evaporated at the initial stage of the thermal treatment disclosed below.

After evaporation of the organic solvent, the electrode material 12 having the film precursor 14' thereon is exposed to a thermal treatment having a temperature equal to or less than 500° C., or to an ultraviolet (UV) light irradiation process, or to both the thermal treatment and the UV light irradiation. The process selected provides a sufficient amount of heat and/or light to cure the film precursor 14' to form the carbon film 14. The thermal treatment and/or UV light irradiation may take place for a time period ranging from about 5 minutes to about 24 hours. Using a combination of the thermal treatment and the UV light irradiation may speed up the curing process. It may also be advantageous to use a combination of thermal treatment and UV light irradiation, or UV light irradiation alone, when curing carbon films 14 that are formed on temperature sensitive electrode materials 12, for example, Si or Sn based amorphous materials. When Si or Sn amorphous materials are exposed to thermal treatment above 200° C., the heat treatment may, in some instances, induce crystallization of the amorphous structure. As a result, the amorphous structure of the electrode 12 cannot be retained. In these instances, UV light irradiation alone or a combination of a thermal treatment at a temperature less than 200° C. and UV light irradiation may be used so that the carbon film 14 is formed and the amorphous structure of the electrode material 12 is retained.

An example of the thermal and/or UV light treatment is schematically shown in FIG. 2. The conveyer belt system 18 transports the electrode material 12 having the film precursor 14' thereon to a chamber 22, where the electrode material 12 and the film precursor 14' are exposed to heat equal to or less than 500° C. and/or UV light. It is believed that the temperature for thermal treatment may be higher, as long as the selected temperature does not damage the surface of the electrode material 12. The chamber 22 may be an oven, a UV exposure unit, or some other device that is capable of generating sufficient UV light and/or heat, for example, an infra-red lamp. It is to be understood that, in some examples, the chamber 22 does not have to have a reducing environment (i.e., the treatment can take place in the atmosphere or in an inert environment).

After the pre-formed electrode is coated with the carbon film 14, the resulting carbon film coated electrode material 10 may be used, for example, in a lithium ion battery as the positive or negative electrode, depending upon the material used as the electrode material 12. However, after the electrode active material particles are coated with the carbon film 14, the resulting carbon film coated electrode material 10 may undergo subsequent processing to form an electrode.

The electrode may be made by mixing the carbon film coated electrode material 10 with a conductive additive (such as graphene, graphite, carbon nanotubes, carbon nanofibers, a carbon black material, e.g., Super-P, KS-6, etc.) and a polymeric binder (e.g., polytetrafluoroethylene (PTFE), polyvinylidene fluoride (PVDF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-poly-ethylenimine, polyimide, etc.) to form a mixture.

In an example, the mixture includes up to 95 wt. % (of the total solids) of the carbon film coated electrode material 10, up to 50 wt. % (of the total solids) of the conductive additive, and up to 30 wt. % (of the total solids) of the polymeric binder. As examples, the amount of the carbon film coated electrode material 10 may range from about 60 wt. % to about 90 wt. % (of the total solids), the amount of the conductive additive may range from about 5 wt. % to about 30 wt. % (of the total solids), and the amount of the polymeric binder may range from about 5 wt. % to about 30 wt. % (of the total solids). Any suitable amount of the respective materials may be used as long as the total solids wt. % is 100.

This mixture may be made into a slurry by adding drops of a liquid, such as a polar aprotic solvent. Examples of suitable polar aprotic solvents include N-methyl-2-pyrrolidone (NMP), dimethylacetamide (DMAc), dimethylformamide (DMF), dimethylsulfoxide (DMSO), water, or another Lewis base, or combinations thereof. The slurry may be spread in the form of a sheet. The slurry (in sheet form) may then be punched and dried to form the desired electrode. In an example, drying occurs at about 100° C. for about 4 hours under vacuum. These conditions effectively remove moisture and organic solvent if it is used, from the formed electrodes.

It is to be understood that the method(s) disclosed herein may also be suitable for forming a carbon film on a substrate other than the electrode materials discussed above. For example, the substrate can be any automotive component, especially those susceptible to wear and/or corrosion. The carbon film provides a coating on the automotive component, and thus protects the automotive component from wear and/or corrosion. In other words, the carbon film can increase the wear and/or corrosion resistance of the component to which it is applied. In this example, the thermal treatment may involve any temperature that will not degrade or otherwise damage the selected substrate. In this example, it may also be desirable to perform the thermal and/or UV treatment in a protected environment, such as $H_2$.

Examples of the electrode disclosed herein may be utilized in a lithium ion battery or a lithium-sulfur battery. Each of these batteries will now be discussed.

The lithium ion battery generally operates by reversibly passing lithium ions between a negative electrode (e.g., anode) and a positive electrode (e.g., cathode). In the fully charged state, the voltage of the battery is at a maximum (typically in the range 2.0V to 5.0V); while in the fully discharged state, the voltage of the battery is at a minimum (typically in the range 0V to 2.0V). Essentially, the Fermi energy levels of active materials in the positive and negative electrodes change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, an external load device enables an electronic current flow in an external circuit with a direction such that the difference between the Fermi levels (and, correspondingly, the cell voltage) decreases. The reverse happens during battery charging: the battery charger forces an electronic current flow in the external circuit with a direction such that the difference between the Fermi levels (and, correspondingly, the cell voltage) increases.

In the lithium ion battery, the negative and positive electrodes (which may include the carbon film coated electrode material 10) are situated on opposite sides of a microporous polymer separator that is soaked with an electrolyte solution suitable for conducting lithium ions.

The porous separator may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Mississippi)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator may be chosen from a combination of the polyolefin (such as PE and/or PP) and one or more of the polymers listed above.

The porous separator may contain a single layer or a multi-layer laminate fabricated from either a dry or wet process. For example, a single layer of the polyolefin and/or other listed polymer may constitute the entirety of the porous separator. As another example, however, multiple discrete layers of similar or dissimilar polyolefins and/or polymers may be assembled into the porous separator. In one example, a discrete layer of one or more of the polymers may be coated on a discrete layer of the polyolefin to form the porous separator. Further, the polyolefin (and/or other polymer) layer, and any other optional polymer layers, may further be included in the porous separator as a fibrous layer to help provide the porous separator with appropriate structural and porosity characteristics. Still other suitable porous separators include those that have a ceramic layer attached thereto, and those that have ceramic filler in the polymer matrix (i.e., an organic-inorganic composite matrix).

The electrolyte solution may contain a lithium salt dissolved in a non-aqueous solvent. Any appropriate electrolyte solution that can conduct lithium ions between the negative electrode and the positive electrode may be used in the lithium ion battery. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(FSO_2)_2$, $LiN(CF_3SO_2)_2$, $LiAsF_6$, $LiPF_6$, LITFSI, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran,1,3-dioxolane), and mixtures thereof.

Each of the negative and positive electrodes is also accommodated by a current collector (e.g., copper on the negative side and aluminum on the positive side). The current collectors associated with the two electrodes are connected by an interruptible external circuit that allows an electric current to pass between the electrodes to electrically balance the related migration of lithium ions.

The lithium ion battery, or a plurality of lithium ion batteries that are connected in series or in parallel, can be utilized to reversibly supply power to an associated load device. A brief discussion of a single power cycle beginning with battery discharge follows.

At the beginning of a discharge, the negative electrode of a lithium ion battery contains a high concentration of intercalated lithium while the positive electrode is relatively depleted. The establishment of a closed external circuit between the negative and positive electrodes under such circumstances causes the extraction of intercalated lithium from the negative electrode. The extracted lithium atoms are split into lithium ions and electrons as they leave an intercalation host at the electrode-electrolyte interface. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to the load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the lithium present in the positive electrode to produce lithium ions and electrons. The lithium ions are carried back through the separator by the electrolyte solution, and the electrons are driven back through the external circuit, both towards the negative electrode. The lithium ions and electrons are ultimately reunited at the negative electrode, thus replenishing it with intercalated lithium for future battery discharge.

The lithium-sulfur battery contains the negative electrode (which may include the carbon film coated electrode material 10), the negative side current collector, the positive electrode (which may include the carbon film coated electrode material 10), the positive-side current collector, and the porous separator positioned between the negative electrode and the positive electrode. It is to be understood that the porous separator may be the same type of porous separator that is used in a lithium ion battery described herein. The polymer separator is also soaked with an electrolyte solution suitable for conducting lithium ions.

For the lithium-sulfur battery, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$, $LiN(CF_3SO_2)_2$, $LiB(C_2O_4)_2$ (LiBOB), $LiBF_2(C_2O_4)$ (LiODFB), $LiPF_4(C_2O_4)$ (LiFOP), $LiNO_3$, $LiPF_6$, LITFSI, and mixtures thereof.

The positive and negative electrodes are in contact with respective current collectors. The negative current collector and positive current collector described herein for the lithium ion battery may also be used in the lithium-sulfur battery. The negative-side current collector collects and moves free electrons to and from an external circuit. The positive-side current collector collects and moves free electrons to and from the external circuit.

The lithium-sulfur battery may support a load device that can be operatively connected to the external circuit. The load device receives a feed of electrical energy from the electric current passing through the external circuit when the lithium-sulfur battery is discharging. While the load device may be any number of known electrically-powered devices, a few specific examples of a power-consuming load device include an electric motor for a hybrid vehicle or an all-electrical vehicle, a laptop computer, a cellular phone, and a cordless power tool. The load device may also, however, be an electrical power-generating apparatus that charges the lithium-sulfur battery for purposes of storing energy. For instance, the tendency of windmills and solar panels to variably and/or intermittently generate electricity often results in a need to store surplus energy for later use.

The lithium-sulfur battery can include a wide range of other components that, while not depicted here, are nonetheless known to skilled artisans. For instance, the lithium-sulfur battery may include a casing, gaskets, terminals, tabs, and any other desirable components or materials that may be situated between or around the negative electrode and the positive electrode for performance-related or other practical purposes. Moreover, the size and shape of the lithium-sulfur battery, as well as the design and chemical make-up of its main components, may vary depending on the particular application for which it is designed. Battery-powered automobiles and hand-held consumer electronic devices, for example, are two instances where the lithium-sulfur battery would most likely be designed to different size, capacity, and power-output specifications. The lithium-sulfur battery may also be connected in series and/or in parallel with other similar lithium-sulfur batteries to produce a greater voltage output and current (if arranged in parallel) or voltage (if arranged in series) if the load device so requires.

The lithium-sulfur battery can generate a useful electric current during battery discharge. During discharge, the chemical processes in the battery include lithium ($Li^+$) dissolution from the surface of the negative electrode and incorporation of the lithium cations into alkali metal polysulfide salts (i.e., $Li_2S$) in the positive electrode. As such, polysulfides are formed (sulfur is reduced) on the surface of the positive electrode in sequence while the battery is discharging. The chemical potential difference between the positive electrode and the negative electrode (ranging from approximately 1.5 to 3.0 volts, depending on the exact chemical make-up of the electrodes) drives electrons produced by the dissolution of lithium at the negative electrode through the external circuit towards the positive electrode. The resulting electric current passing through the external circuit can be harnessed and directed through the load device until the lithium in the negative electrode is depleted and the capacity of the lithium-sulfur battery is diminished.

The lithium-sulfur battery can be charged or re-powered at any time by applying an external power source to the lithium-sulfur battery to reverse the electrochemical reactions that occur during battery discharge. During, lithium plating to the negative electrode takes place, and sulfur formation at the positive electrode takes place. The connection of an external power source to the lithium-sulfur battery compels the otherwise non-spontaneous oxidation of lithium at the positive electrode to produce electrons and lithium ions. The electrons, which flow back towards the negative electrode through the external circuit, and the lithium ions ($Li^+$), which are carried by the electrolyte across the porous membrane back towards the negative electrode, reunite at the negative electrode and replenish it with lithium for consumption during the next battery discharge cycle. The external power source that may be used to charge the lithium-sulfur battery may vary depending on the size, construction, and particular end-use of the lithium-sulfur battery. Some suitable external power sources include a battery charger plugged into an AC wall outlet and a motor vehicle alternator.

To further illustrate the present disclosure, an example is given herein. It is to be understood that this example is provided for illustrative purposes and is not to be construed as limiting the scope of the present disclosure.

EXAMPLE

The carbon film coated electrode material was formed by dissolving carbonaceous mesophase (in this instance, derivatives of naphthalene) into toluene. This formed the solution used to form the carbon film precursor.

Figure 4:
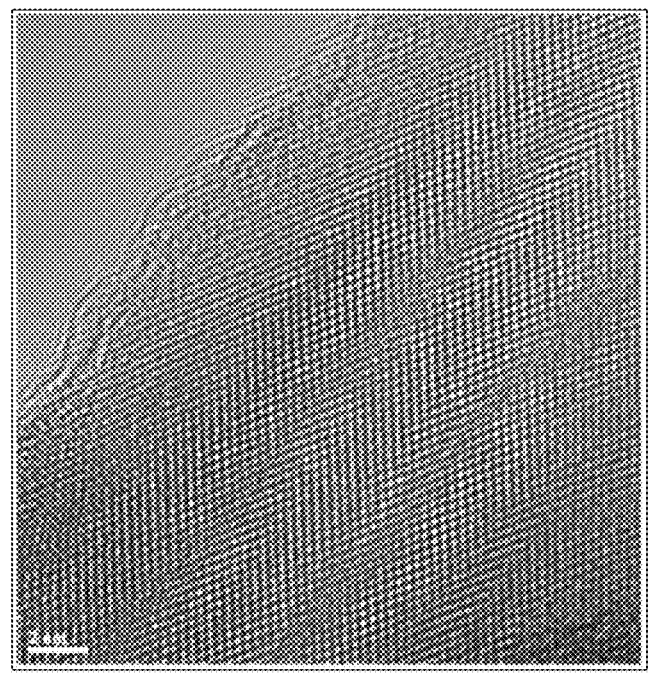
FIG. 4 is a high-resolution transmission electron microscopy (HRTEM) image of an example of the carbon film formed by an example of the surface coating method disclosed herein.

A free-standing carbon film was formed from this precursor by exposing some of the precursor to a heat treatment at about 80° C. FIG. 4 is a HRTEM of this free-standing carbon film. The image shows the arrangement of carbon atoms in ultrathin carbon free-standing layers.

Sample negative electrodes 1, 2A, 2B and 3 were formed by dipping respective pre-formed electrodes into the solution for 1 minute, removing the electrodes from the solution, and exposing the respective electrodes to low temperature heating or UV irradiation. Samples 1 and 3 were pre-formed silicon film (i.e., silicon based) electrodes that, after being coated with the solution, were exposed to low temperature heating. Samples 2A and 2B were pre-formed silicon coated carbon nanofiber electrodes that, after being coated with the solution, were exposed to UV irradiation. The coated negative electrodes were punched into 12 mm diameter discs.

Comparative sample negative electrodes were also used. Comparative sample negative electrodes 1' and 3' were pre-formed silicon film electrodes that were not coated with the carbon film disclosed herein. Comparative sample negative electrodes 2A' and 2B' were pre-formed silicon coated carbon nanofiber electrodes that were not coated with the carbon film disclosed herein.

Samples 1, 2A, 2B and 3, and Comparative Samples 1', 2A', 2B' and 3' were assembled into respective coin cells (i.e., half cells). The coin cells were composed of a copper current collector, one of the Sample negative electrodes or Comparative Sample negative electrodes, a microporous polyethylene separator, and lithium as a counter electrode. The coin cells were assembled in an argon-filled glove box. The electrolyte was a 1.0M $LiPF_6$ solution in ethylene carbonate/diethyl carbonate (EC/DEC) plus 10 wt. % fluororethylene carbonate. Galvanostatic charge and discharge cycle tests were carried out at 25° C. between 0.05 and 1.5 V. It is noted that Samples 1 and 3 were the same type of negative electrode, except that Sample 1 was tested at a C rate of C/3, and Sample 3 was tested at different C rates (as noted in FIG. 7).

Figure 3:
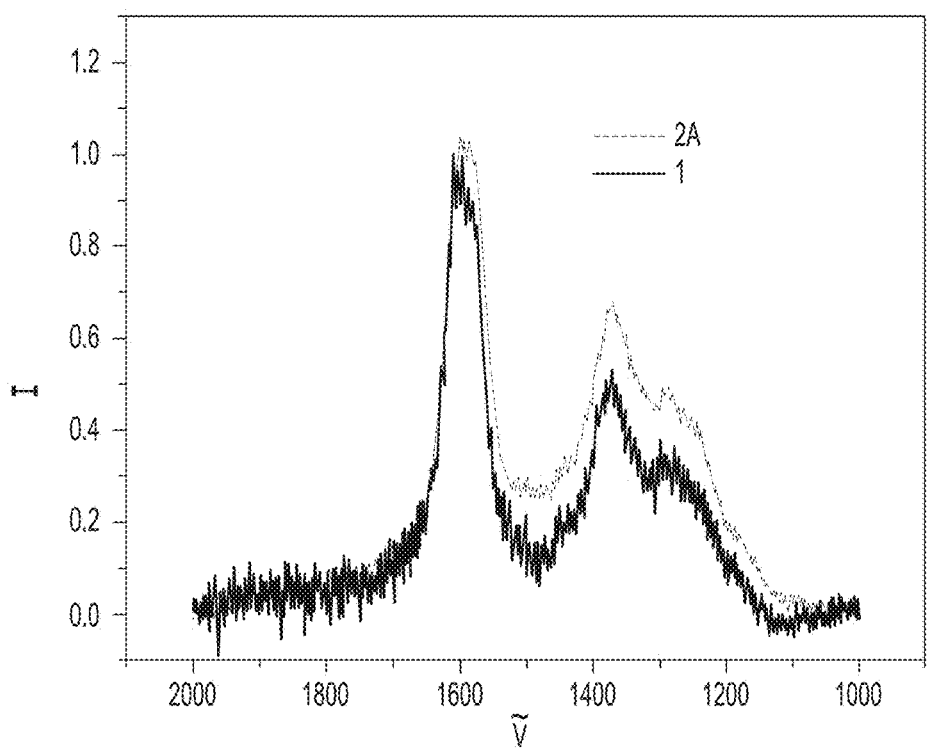
FIG. 3 is a graph depicting the Raman spectra of examples of the carbon film formed by examples of the surface coating method disclosed herein.

FIG. 3 illustrates the Raman spectra of Sample 1, exposed to room temperature thermal treatment, and Sample 2A, exposed to UV treatment. The Y axis (labeled "I") is intensity (arbitrary units, a.u.) and the X axis (labeled "$\tilde{v}$") is the wavenumber ($cm^{-1}$). The spectra for each Sample shows typical carbon features, including peaks at about 1600 cm−1, which are indicative of graphitic carbon.

Figure 5:
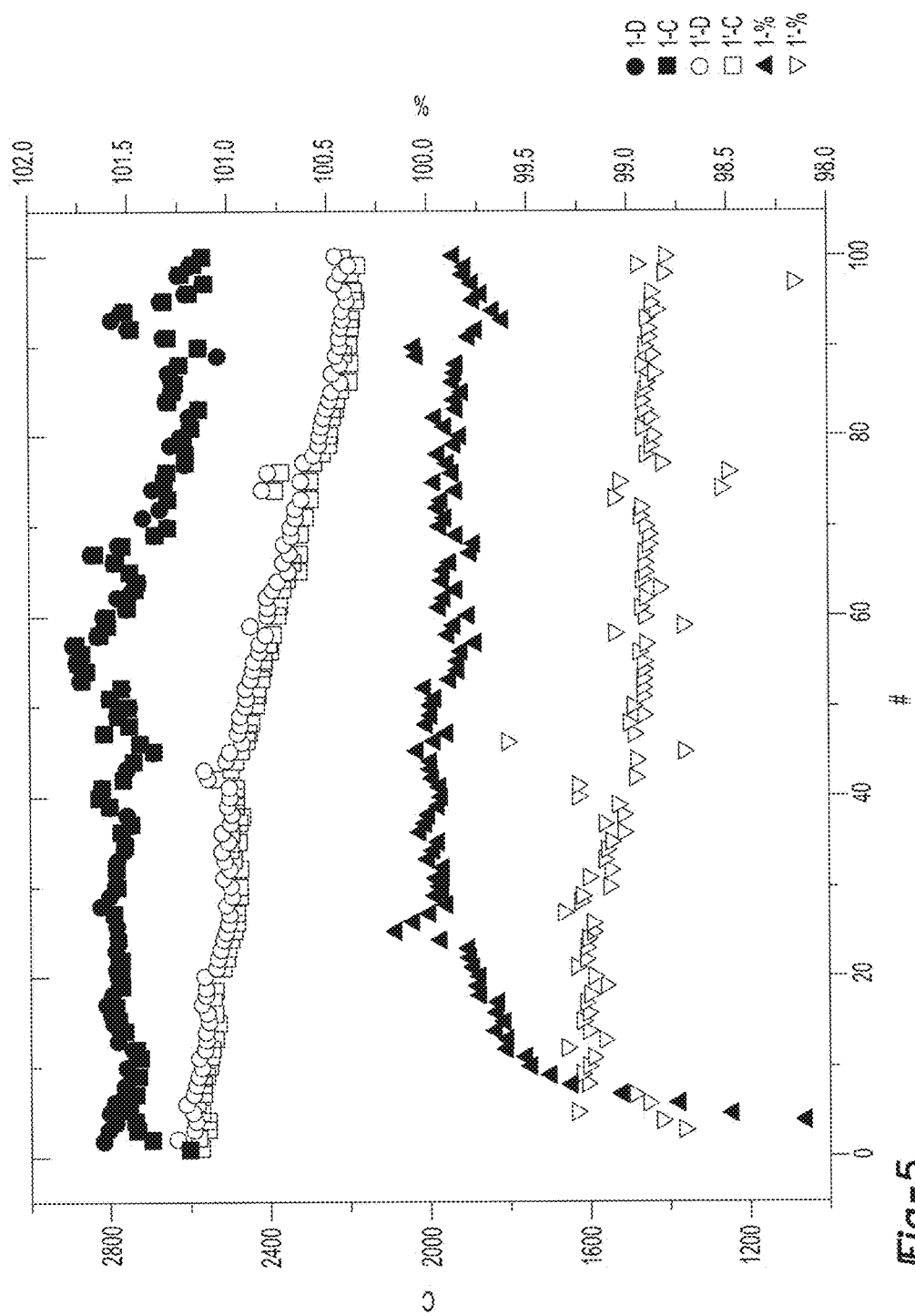
FIG. 5 is a graph of the electrochemical cycle performance (showing both capacity—left Y axis—and coulombic efficiency—right Y axis) for a silicon based comparative negative electrode and an example of a carbon film coated silicon based negative electrode formed by an example of the surface coating method disclosed herein.

FIG. 5 illustrates the capacity (mAh/g, left Y axis) and coulombic efficiency (%, right Y axis) versus the cycle number (#, X axis). More specifically, the charge (1-C, 1'-C) and discharge curves (1-D, 1'-D), as well as the coulombic efficiency (1-%, 1'-%) of Sample 1 and Comparative Sample 1' are shown. These results indicate that the carbon film (used in Sample 1) improved the capacity retention (greater than 94% after 100 cycles) and the cycle efficiency (greater than 99.5%) for the pre-formed silicon film electrode. The uncoated pre-formed silicon film electrode (Comparative Sample 1') had lower overall performance. The carbon film surface coating used in Sample 1 may mitigate both mechanical and chemical degradation of the pre-formed silicon film electrode, enhance the electrical conductivity of the pre-formed silicon film electrode, and/or suppress undesirable side reactions within the half cell; and any of these effects may be contributing to the improved performance.

Figure 6:
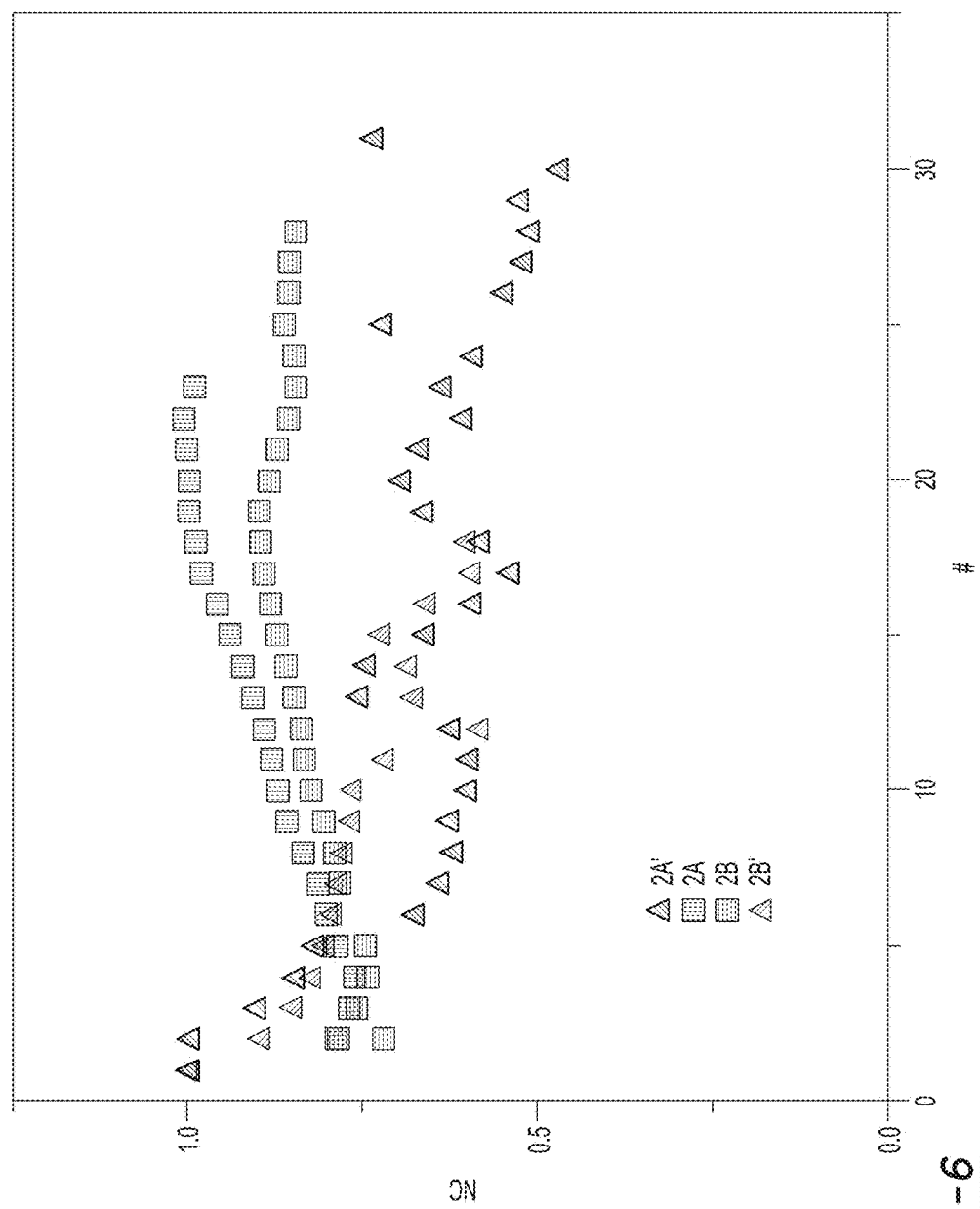
FIG. 6 is a graph showing the normalized capacity for a comparative silicon coated carbon nanofiber negative electrode and an example of a silicon coated carbon nanofiber negative electrode coated with an example of the carbon film formed by an example of the surface coating method disclosed herein.

FIG. 6 illustrates the discharge curves as a function of normalized capacity ("NC", a.u.) versus cycle number (#) for each of Samples 2A and 2B and Comparative Samples 2A' and 2B' (all of which were tested under the same conditions). As illustrated, the carbon film (Samples 2A and 2B) improved the cycle stability of the silicon coated carbon nanofiber electrode. The carbon film surface coating used in Samples 2A and 2B may exhibit any of the effects previously described, which may be contributing to the improved cycle stability.

Figure 7:
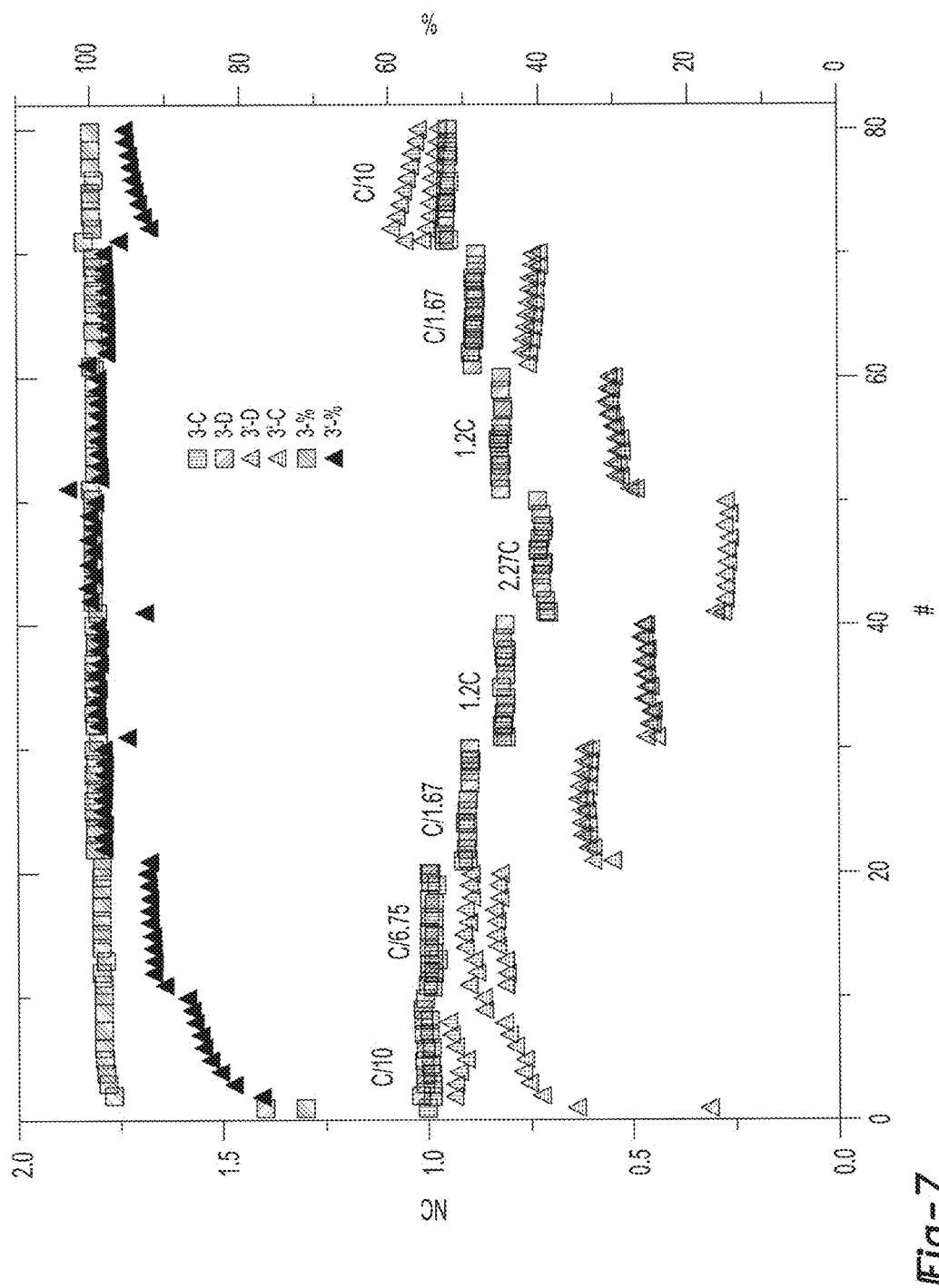
FIG. 7 is a rate capability graph (showing both normalized capacity—left Y axis—and coulombic efficiency—right Y axis) for a comparative silicon based negative electrode and an example of a carbon film coated silicon based negative electrode formed by an example of the surface coating method disclosed herein.

FIG. 7 illustrates the normalized capacity ("NC", a.u., left Y axis) and the coulombic efficiency (%, right Y axis) versus the cycle number (#. X axis) of Sample 3 and Comparative Sample 3'. These results indicate that the carbon film (Sample 3) improved the rate capability for the pre-formed silicon film electrode. The carbon film surface coating used in Sample 3 may exhibit any of the effects previously described, which may be contributing to the improved rate capability.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 60 wt. % to about 90 wt. % should be interpreted to include not only the explicitly recited limits of about 60 wt. % to about 90 wt. %, but also to include individual values, such as 63.5 wt. %, 71 wt. %, 88 wt %, etc., and sub-ranges, such as from about 65 wt. % to about 80 wt. %; from about 75 wt. % to about 85 wt. %, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A surface coating method, comprising:
dissolving a polycyclic aromatic hydrocarbon selected from the group consisting of Anthracene, Benzo[a]pyrene, Chrysene, Coronene, Corannulene, Tetracene, Naphthalene, Pentacene, Phenanthrene, Pyrene, Triphenylene, Ovalene, and mixtures thereof in an organic solvent to form a solution;
forming a film precursor on a surface of an amorphous electrode material selected from the group consisting of a silicon-based amorphous material and a tin-based amorphous material by:
immersing the amorphous electrode material into the solution, the amorphous electrode material being selected from the group consisting of an amorphous electrode active material particle and a pre-formed electrode including an amorphous electrode active material particle; and
evaporating the organic solvent; and
exposing the film precursor to ultraviolet (UV) light irradiation or a combination of a thermal treatment at a temperature less than 200° C. and UV light irradiation, thereby carbonizing the film precursor to form a carbon film on the surface of the amorphous electrode material and retaining an amorphous structure of the amorphous electrode material.

2. The surface coating method as defined in claim 1 wherein the organic solvent is selected from the group consisting of toluene, xylene, tetrahydrofuran, ethylbenzene, mesitylene, durene, 2-phenylhexane, biphenyl, aniline, nitrobenzene, acetylsalicylic acid, paracetamol, and mixtures thereof.

3. The surface coating method as defined in claim 1 wherein:
the dissolving step includes heating the organic solvent to a temperature up to 100° C.;
prior to forming the film precursor, the method further includes allowing the solution to sit for a predetermined time to allow the organic solvent to break molecular interaction between atoms of the polycyclic aromatic hydrocarbon to form a 2D single molecular layer; and
immersing the amorphous electrode material into the solution includes:
mixing the amorphous electrode active material particle with the solution to form a mixture; and
allowing the mixture to sit for a predetermined time to allow the 2D single molecular layer to interact with and bond to functional groups on a surface of the amorphous electrode active material particle.

4. The surface coating method as defined in claim 3, further comprising exposing the carbon film coated amorphous electrode active material particle to an electrode forming process, which includes mixing the carbon film coated amorphous electrode active material particle with a polymer binder and a conductive additive.

5. The surface coating method as defined in claim 3 wherein the amorphous electrode active material particle is a tin based amorphous material.

6. The surface coating method as defined in claim 1 wherein:
prior to immersing the electrode material into the solution, the method further includes allowing the solution to sit for a predetermined time to allow the organic solvent to break molecular interaction between atoms of the polycyclic aromatic hydrocarbon to form a 2D single molecular layer; and
immersing the amorphous electrode material into the solution includes:
dipping the pre-formed electrode into the solution; and
allowing the pre-formed electrode to sit in the solution for a predetermined time to allow the 2D single molecular layer to interact with and bond to functional groups on a surface of the pre-formed electrode.

7. The surface coating method as defined in claim 6 wherein the pre-formed electrode includes a tin based amorphous electrode active material particle.

8. The surface coating method as defined in claim 1 wherein the ultraviolet light irradiation is accomplished for a time ranging from about 5 minutes to about 24 hours.

9. The surface coating method as defined in claim 1 wherein the combination of the thermal treatment and the ultraviolet light irradiation is accomplished for a time ranging from about 5 minutes to about 24 hours.

10. A carbon film coated amorphous electrode material formed by the method as defined in claim 1.

11. A method for improving electrochemical performance of an electrode for a lithium ion battery, the method comprising:
    dissolving a polycyclic aromatic hydrocarbon selected from the group consisting of Anthracene, Benzo[a]pyrene, Chrysene, Coronene, Corannulene, Tetracene, Naphthalene, Pentacene, Phenanthrene, Pyrene, Triphenylene, Ovalene, and mixtures thereof in an organic solvent to form a solution;
    forming a film precursor on a surface of an amorphous electrode active material particle selected from the group consisting of a silicon-based amorphous material and a tin-based amorphous material by:
        immersing the amorphous electrode active material particle into the solution; and
        evaporating the organic solvent;
    exposing the film precursor to ultraviolet (UV) light irradiation or a combination of a thermal treatment at a temperature less than 200° C. and UV light irradiation, thereby carbonizing the film precursor to form a carbon film on the surface of the amorphous electrode active material particle and retaining an amorphous structure of the amorphous electrode active material particle;: and
    using the carbon film coated amorphous electrode active material particle to form the electrode.

12. The method as defined in claim 11 wherein using the carbon film coated amorphous electrode active material particle to form the electrode includes:
    mixing the carbon film coated amorphous electrode active material particle with a conductive additive and a polymeric binder to form a mixture;
    forming a slurry of the mixture;
    spreading the slurry into a sheet form; and
    drying the sheet form to generate the electrode.

13. The method as defined in claim 12 wherein the mixture includes up to 95 wt. % of the carbon film coated amorphous electrode active material particle, up to 30 wt. % of the conductive additive, and up to 30 wt. % of the polymeric binder.

14. The method as defined in claim 11 wherein the electrode active material particle is a tin based amorphous electrode active material particle.

15. The method as defined in claim 11 wherein:
    the dissolving step includes heating the organic solvent to a temperature up to 100° C.;
    prior to forming the film precursor, the method further includes allowing the solution to sit for a predetermined time to allow the organic solvent to break molecular interaction between atoms of the polycyclic aromatic hydrocarbon to form a 2D single molecular layer; and
    immersing the amorphous electrode active material particle into the solution includes:
        mixing the amorphous electrode active material particle with the solution to form a mixture; and
        allowing the mixture to sit for a predetermined time to allow the 2D single molecular layer to interact with and bond to functional groups on a surface of the amorphous electrode active material particle.

* * * * *